(No Model.)

J. M. CLARK.
HORSE HAY RAKE.

No. 292,988. Patented Feb. 5, 1884.

WITNESSES:
Fred. G. Dieterich
A. G. Lepne.

INVENTOR:
J. Max Clark
BY Munn & Co.
ATTORNEYS.

UNITED STATES PATENT OFFICE.

JAMES MAXWELL CLARK, OF GREELEY, COLORADO.

HORSE HAY-RAKE.

SPECIFICATION forming part of Letters Patent No. 292,988, dated February 5, 1884.

Application filed June 7, 1883. (No model.)

*To all whom it may concern:*

Be it known that I, JAMES MAXWELL CLARK, of Greeley, in the county of Weld and State of Colorado, have invented a new and useful Improvement in Horse Hay-Rakes, of which the following is a full, clear, and exact description, reference being had to the annexed drawings, forming part of this specification.

This invention relates to hay-rakes which are adapted to be dumped by the rotation of the axle; and the invention consists of an improved means for holding and operating the devices for controlling the action of the rake, as hereinafter described and claimed.

Figure 1:
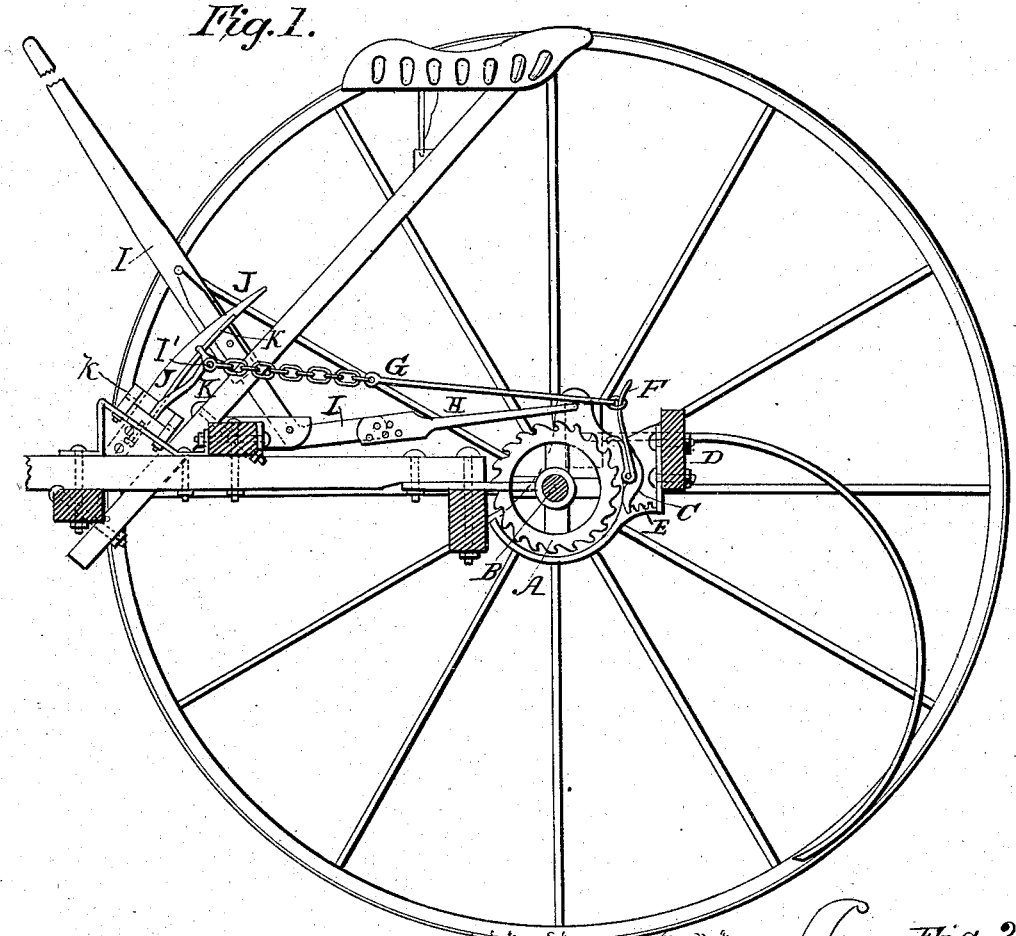
Figure 2:
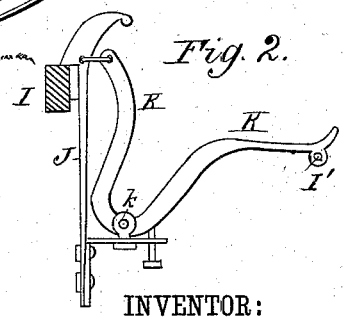

In the drawings, Figure 1 is a side elevation, partly in section, of a rake embodying my invention, and Fig. 2 is a detail front view of the dumping foot-lever.

A indicates a ratchet-wheel on the rotating axle B, and C is a pawl pivoted to the rake-head D, and adapted to be held out of engagement with the ratchet-wheel by the spring E.

To an arm, F, on the pawl C is connected a chain and rod, G, for drawing the pawl forward into engagement with the ratchet, to allow the latter to lift the rake and dump the load of hay.

To the rake-head is connected a lever, I, by means of a rod, H, which lever is adapted to be pressed forward to hold the rake down while it is filling with hay.

Heretofore an elbow-catch has been pivoted to the frame in a position to oscillate in an approximately horizontal plane, to engage the holding-lever when the latter is pressed forward, and is adapted to hold it by the action of a spiral retaining-spring, while the rod G, or its equivalent, has been attached to an independent foot-lever, adapted to be pressed forward in a vertical plane to dump the rake, and so located that when pressed forward it will strike one end of the elbow-catch and cause it to release the lever I. Where the pawl C, however, is drawn forward to engage the ratchet-wheel, as shown in the drawings, it is evident that the lever I must be released before the said pawl is thrown into engagement with the ratchet-wheel; otherwise the dumping and the holding devices will counteract each other and cause breakage of some of the parts. Consequently it is the initial movement of the rod G that must cause the release of the lever I in a rake like that shown in the drawings. Now, where two independent parts—such as the elbow-catch and foot-lever—are used, these parts have not been adapted to move simultaneously, because such movement was not necessary, the pawls being arranged differently from the pawl C. I therefore provide a spring-catch, J, adapted to engage and hold the lever I when the latter is pressed forward. This catch or hook is connected to a bell-crank lever or treadle, K, which is pivoted at k to the framework of the rake, in position to adapt it, with the spring-catch, to move in an oblique plane, so that it may be operated by the easy downward movement of the driver's foot, and at the same time draw forward the chain G, which is connected to the under side of the treadle at I'. With this construction the lever I may be pressed forward into engagement with the hook J to hold the rake down, and when the rake is full, by pressing on the treadle K, the lever will be released by the lateral movement thus given to the hook J, and by the same operation the chain G will be drawn forward to draw the pawl C into engagement with the ratchet-wheel and dump the rake.

What I claim is—

The combination, with the lever I and chain or rod G, connected to a forward-moving pawl, of the spring-catch J and bell-crank lever or treadle K, connected to the catch and to the chain or rod G, and adapted to move in an oblique plane, substantially as shown and described, and for the purpose set forth.

JAMES MAXWELL CLARK.

Witnesses:
A. N. OLSON,
HORACE G. CLARK.